US010644950B2

(12) United States Patent
Hu

(10) Patent No.: US 10,644,950 B2
(45) Date of Patent: May 5, 2020

(54) DYNAMIC POLICY BASED SOFTWARE DEFINED NETWORK MECHANISM

(71) Applicant: AT&T Intellectual Property I, L.P., Atlanta, GA (US)

(72) Inventor: Qingmin Hu, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 636 days.

(21) Appl. No.: 14/496,306

(22) Filed: Sep. 25, 2014

(65) Prior Publication Data

US 2016/0094395 A1 Mar. 31, 2016

(51) Int. Cl.
| | |
|---|---|
| H04L 12/14 | (2006.01) |
| H04W 28/16 | (2009.01) |
| H04W 4/60 | (2018.01) |
| H04W 8/18 | (2009.01) |
| H04L 12/24 | (2006.01) |

(52) U.S. Cl.
CPC ........... H04L 41/0893 (2013.01); H04W 4/60 (2018.02); H04W 28/16 (2013.01); H04W 8/18 (2013.01)

(58) Field of Classification Search
CPC .... H04L 41/0893; H04L 67/12; H04W 4/003; H04W 72/048; H04W 4/60; H04W 28/16; H04W 8/18
See application file for complete search history.

(56) References Cited

U.S. PATENT DOCUMENTS

| | | |
|---|---|---|
| 8,521,905 B2 | 8/2013 | Beliveau et al. |
| 8,693,374 B1 | 4/2014 | Murphy et al. |

(Continued)

FOREIGN PATENT DOCUMENTS

| | | |
|---|---|---|
| JP | 2013030863 A | 2/2013 |
| WO | 2013104375 A1 | 7/2013 |

OTHER PUBLICATIONS

"Realizing the power of SDN with HP Virtual Application Networks", HP, Technical White Paper, Oct. 2012. 10 pages.

(Continued)

Primary Examiner — Charles C Jiang
Assistant Examiner — Voster Preval
(74) Attorney, Agent, or Firm — Amin, Turocy & Watson, LLP

(57) ABSTRACT

Improving wireless service subscriber experiences by dynamically managing wireless communication resources using a big data analytic mechanism is presented herein. A method can include receiving, by a system comprising a processor via a software-based interface of a control plane of a communication network, service data corresponding to a request for a wireless communication service; receiving, by the system via the software-based interface of the control plane, contextual data corresponding to a subscription of the wireless communication service; receiving, by the system via the software-based interface of the control plane, network data corresponding to data packet transmissions of a network device within a data plane of the communication network; and configuring, by the system via the software-based interface of the control plane based on a defined set of policies, the service data, the contextual data, and the network data, a resource of the data plane corresponding to the wireless communication service.

20 Claims, 12 Drawing Sheets

(56) References Cited

U.S. PATENT DOCUMENTS

| | | | |
|---|---|---|---|
| 8,711,860 B2 | 4/2014 | Beliveau et al. | |
| 2012/0002614 A1* | 1/2012 | Ekici | H04W 48/18 |
| | | | 370/329 |
| 2012/0079089 A1* | 3/2012 | Lin | H04L 41/0836 |
| | | | 709/223 |
| 2013/0166703 A1* | 6/2013 | Hammer | H04L 41/50 |
| | | | 709/220 |
| 2013/0223226 A1 | 8/2013 | Narayanan et al. | |
| 2013/0250770 A1 | 9/2013 | Zou et al. | |
| 2013/0266007 A1 | 10/2013 | Kumbhare et al. | |
| 2013/0283374 A1 | 10/2013 | Zisapel et al. | |
| 2013/0311675 A1 | 11/2013 | Kancherla | |
| 2013/0318243 A1 | 11/2013 | Chinthalapati et al. | |
| 2013/0329601 A1 | 12/2013 | Yin et al. | |
| 2013/0332619 A1 | 12/2013 | Xie et al. | |
| 2014/0003422 A1 | 1/2014 | Mogul et al. | |
| 2014/0052836 A1 | 2/2014 | Nguyen et al. | |
| 2014/0095685 A1 | 4/2014 | Cvijetic et al. | |
| 2014/0098669 A1 | 4/2014 | Garg et al. | |
| 2014/0098710 A1 | 4/2014 | Ong | |
| 2014/0112150 A1 | 4/2014 | Ko et al. | |
| 2014/0112190 A1 | 4/2014 | Chou et al. | |
| 2014/0119367 A1 | 5/2014 | Han et al. | |
| 2014/0122668 A1 | 5/2014 | Nieminen | |
| 2014/0146664 A1 | 5/2014 | Amante | |
| 2014/0160984 A1 | 6/2014 | Hallivuori | |
| 2014/0169158 A1 | 6/2014 | Mishra et al. | |
| 2014/0177634 A1 | 6/2014 | Jiang et al. | |
| 2014/0204746 A1* | 7/2014 | Sun | H04W 28/08 |
| | | | 370/235 |
| 2014/0376406 A1* | 12/2014 | Kim | H04L 41/12 |
| | | | 370/254 |
| 2016/0094395 A1* | 3/2016 | Hu | H04W 28/16 |
| | | | 370/254 |
| 2016/0234104 A1* | 8/2016 | Hoffmann | H04L 41/0806 |
| 2017/0126569 A1* | 5/2017 | Seed | H04L 47/125 |
| 2017/0272962 A1* | 9/2017 | Lu | H04W 24/02 |

OTHER PUBLICATIONS

"OpenFlow-enabled SDN and Network Functions Virtualization", OpenFlow, Open Networking Foundation, ONF Solution Brief, Feb. 17, 2014. 12 pages.

Li, et al. "Toward software-defined cellular networks", Software Defined Networking (EWSDN), 2012 European Workshop on. IEEE, 2012. 6 pages.

Voellmy, et al. "Procera: a language for high-level reactive network control", Proceedings of the first workshop on Hot topics in software defined networks. ACM, 2012. 6 pages.

Kissel, et al. "Driving software defined networks with XSP", 2012 IEEE International Conference on Communications (ICC), IEEE, 2012. 6 pages.

* cited by examiner

DYNAMIC POLICY BASED SOFTWARE DEFINED NETWORK MECHANISM

TECHNICAL FIELD

The subject disclosure generally relates to embodiments for a dynamic policy based software defined network mechanism.

BACKGROUND

With an exponential growth of wireless communication devices, Internet of things (IoT), Machine-to-Machine (M2M) technologies, and corresponding applications and services associated with internet protocol (IP), cloud-based mobile communications, real-time management of related resources has become difficult and complex. Consequently, conventional mobile network technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
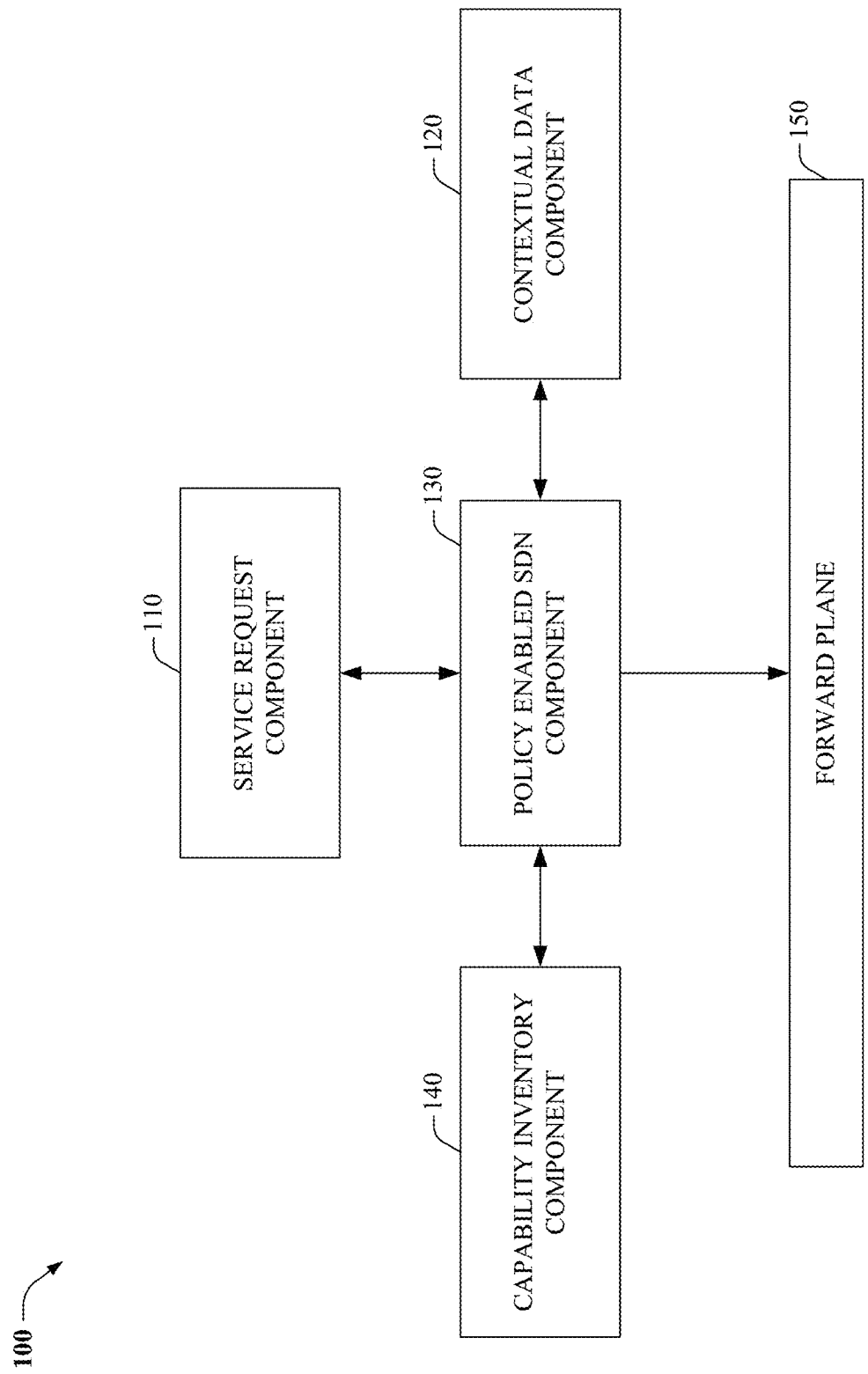
FIG. 1 illustrates a block diagram of a network orchestration and policy based software-defined network (SDN) environment corresponding to a wireless communication network, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

With an exponential growth of wireless communication devices and services, conventional mobile network technologies have had some drawbacks with respect to managing such resources within a cloud-based, mobile network environment. Various embodiments disclosed herein can improve wireless service subscriber experiences by dynamically managing wireless communication resources within a policy based SDN environment utilizing network function virtualization (NFV)-based on a real-time analysis of service data, contextual data, and network data using big data analytics.

For example, a method can include receiving, e.g., in real-time, near real-time, etc. by a system comprising a processor via a software-based interface of a control plane of the wireless communication network, e.g., by a policy enabled SDN component of a wireless communication network, service data corresponding to a request for a wireless communication service, contextual data corresponding to a subscription of the wireless communication service, and network data corresponding to data packet transmissions of a network device within a data plane, forward plane, user plane, etc. of the wireless communication network.

The service data can correspond to requests from applications and services for resources of the wireless communication network, such as a request for a phone call, a message, a video, etc. In other embodiment(s), the service data can include information representing a resource corresponding to the request, a type of service corresponding to the request, a time of the request, information representing a sponsor, or communication provider, of the request, etc.

The contextual data can include device information and user information. The device information can represent a device, e.g., a wireless communication device, etc. corresponding to the request, a type of the wireless communication device, capabilities of the wireless communication device, etc.

The user information can represent an identification (ID) of a subscriber, a user, etc. of the wireless communication service, authentication key(s) corresponding to the wireless communication service, a privacy profile of the subscriber, details of a subscription of the wireless communication service, preference(s) for the wireless communication service, location information of the wireless communication device, charging and/or billing information corresponding to the wireless communication service, type information representing whether the request corresponds to a postpaid service, a prepaid service, a mobile virtual network operator (MVNO), a roaming wireless communication subscriber, etc.

The network data can include information representing conditions of the wireless communication network, a configuration of component(s), device(s), etc. of the wireless communication network, features of the wireless communication network, capabilities of the wireless communication network, quality of service (QoS) information, reporting of current usage, available bandwidth, etc. of the wireless communication network, etc.

Further, the method can include configuring, by the system via the software-based interface of the control plane based on a defined set of policies, e.g., policy framework, policy rules, etc. and the service data, the contextual data, and the network data, a resource of the data plane corresponding to the wireless communication service. In this regard, the system can dynamically configure device(s), service(s), etc. associated with the request to provide improved user experiences within an IP, cloud-based mobile communication network.

In one embodiment, the method can include configuring, by the system, e.g., according to the defined set of policies, the resource utilizing NFV, e.g., within the data plane of the IP, cloud-based mobile communication network. For example, the method can include identifying, by the system via the software-based interface of the control plane, a constraint on the resource based on the network data, e.g., identifying that the network device, e.g., a source gateway (GW), does not have available bandwidth, cannot provide additional communication traffic load, etc. to support the request for the wireless communication service. Further, the method can include configuring, by the system via the software-based interface of the control plane based on the constraint and the defined set of policies, the resource, e.g., the system can utilize an orchestration mechanism to migrate, redirect, etc. a communication session corresponding to the wireless communication service from the source GW to a target GW in response to a determination that the source GW cannot support the request for the wireless communication service.

In another embodiment, the method can utilize big data processing, analytics, e.g., Hadoop, etc. to intelligently and efficiently parse, compress, etc. the service data, the contextual data, the network data, etc. in real-time, near real-time, etc. In this regard, the method can heuristically process, by the system via the software-based interface of the control plane according to the defined set of policies, e.g., in real-time, near real-time, etc. the service data, the contextual data, and the network data using an analytics engine, e.g., Hadoop via set(s) of distributed computing devices utilizing a Hadoop distributed file system (HDFS), to obtain structured or unstructured data. Further, the method can configure, by the system via the software-based interface of the control plane according to the defined set of policies based on the structured or unstructured data, the resource. For example, in response to determining that a constraint, e.g., network congestion corresponding to the resource, defined by a policy rule of the defined set of policies has been met, the system can reconfigure the resource via the software-based interface of the control plane according to the policy rule, e.g., re-route traffic from the resource to another resource.

In yet another embodiment, the method can include modifying, by the system via the software-based interface of the control plane, a policy rule of the defined set of policies based on the service data, the contextual data, the network data, the structured data, the unstructured data, etc. In this regard, the system can anticipate, predict, etc., based on such data, a network condition that would affect communication services. Further, the system can derive, compile, etc., via the software-based interface of the control plane, a revised, optimal, etc. resource configuration based on the network condition. In turn, the system can modify, via the software-based interface of the control plane, the policy rule to account for, utilize, etc, the revised, optimal, etc. resource configuration.

In one embodiment, the method can include publishing, advertising, displaying, etc., by the system via the software-based interface of the control plane, configuration information representing, e.g., the policy rule, the configuration of the resource, etc. via a UI utilizing an application programming interface (API).

In another embodiment, the method can include receiving, by the system via the software-based interface of the control plane, policy input via the UI utilizing an API, and modifying, by the system via the software-based interface of the control plane based on the policy input, a policy rule of the defined set of policies. In this regard, the UI enables modification of the defined set of policies, policy framework, etc. for controlling policy-based operation of the system within a network orchestration and policy based SDN environment.

In one embodiment, a system of a network orchestration and policy based SDN environment can include a policy enabled SDN component communicatively coupled to a service request component and a contextual data component. The policy enabled SDN component can include a policy component that can define a set of policy rules, policy framework, etc. including service policy rules defining actions to be performed utilizing NFV in response to respective conditions being determined to have been met within an SDN environment.

In this regard, the service request component can determine, via a software-based application of a control plane of a communication network based on a service policy rule of the set of policy rules, service data, service information, etc. corresponding to a request for a network service, e.g., a phone call, a message, a video, etc. The service data can include information representing a source, user, subscriber, etc. corresponding to the request, a type of the request, a resource corresponding to the request, a time of the request, information representing a sponsor, or communication provider, of the request, etc.

The contextual data component can determine, via the software-based application of the control plane based on a contextual policy rule of the set of policy rules, contextual information corresponding to, representing, etc. a subscription of the network service. The contextual information can include device data, e.g., representing a type of a wireless communication device corresponding to the subscription, a capability of the wireless communication device, etc. In another embodiment, the contextual information can include user data, e.g., representing an ID of the subscriber, authentication key(s) corresponding to the network service, a privacy profile of the subscriber, a subscription of the network service, charging and/or billing information corresponding to the network service, information representing whether the request corresponds to a postpaid service, a prepaid service, an MVNO, a roaming network service, etc.

In yet another embodiment, the contextual information can include network data, network information, etc., e.g., representing respective conditions of component(s), device(s), etc. within a forward plane, data plane, etc. of the communication network that corresponds to data packet transmissions, a configuration of the component(s), device(s), etc., features of the component(s), device(s), etc., capabilities of the component(s), device(s), etc., QoS information corresponding to the subscription, current usage, available bandwidth, etc. of the communication network, etc.

In this regard, the policy enabled SDN component can control, via the software-based application of the control plane, e.g., in real-time, near real-time, etc. using NFV according to the set of policy rules, a resource of the forward plane, data plane, etc. corresponding to the request, e.g., utilizing a big data analytics component to heuristically process different data domains, or clusters, e.g., corresponding to the service data, the device data, the user data, and the network data.

For example, in one embodiment, the policy enabled SDN component can configure the resource utilizing NFV within the forward plane, data plane, etc. of the communication network. In another embodiment, the big data analytics component can receive the service data, the device data, the user data, and the network data, e.g., in real-time, near real-time, etc. and heuristically process, based on the set of policy rules, such data using analytics components, e.g., Hadoop, etc. via distributed sets of computing devices to obtain processed data. In turn, the contextual data component can determine, using the processed data based on the contextual policy rule, a constraint on a resource based on a condition of an associated network device, e.g., determining that a communication bandwidth of the network device exceeds a defined utilization rate for the network device. Further, the policy enabled SDN component can configure the resource based on the constraint, e.g., re-routing communication traffic from the network device to another network device, e.g., GW.

In one embodiment, the policy enabled SDN component can anticipate, derive, compile, etc. an optimized configuration of the resource, e.g., using the processed data obtained from the big data analytics component, and modify the policy rule via a feedback loop utilizing the policy component.

In yet another embodiment, a capability inventory component can publish, advertise, etc. configuration information of the resource, a policy rule, etc. via an API utilizing a UI component. In another embodiment, the capability inventory component can receive policy input, e.g., representing the configuration information, the policy rule, etc. via the API utilizing the UI component. In this regard, the policy component can modify the policy framework based on the policy input.

Another embodiment can include a computer-readable storage medium having stored thereon computer executable instructions that, in response to execution, cause a computing device including a processor to perform operations, the operations comprising: determining, within a software-based interface of a control plane of a communication network based on a defined policy framework, request data representing a request for a network service; determining, within the software-based interface based on the defined policy framework, contextual data corresponding to a subscription of the network service; determining, within the software-based interface based on the defined policy framework, network data representing a condition of a device within a data plane of the communication network corresponding to data packet transmissions; and controlling, within the software-based interface, a resource within the data plane corresponding to the request based on the defined policy framework, the request data, the contextual data, and the network data In one embodiment, the operations can include configuring the resource using NFV. In another embodiment, the operations can include determining a constraint on the resource based on the condition of the device within the data plane of the communication network, and modifying the network service based on the constraint.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like.

Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary"

and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, via policy rules of a policy framework, etc. as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by policy enabled SDN component 130 (see below), including but not limited to controlling, based on a policy framework, a resource corresponding to a request for a network service utilizing service data, device data, user data, and network data processed via big data analytics component 210 (see below).

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., including policy enabled SDN component 130 (see below), to automatically determine—using service data, device data, user data, and the network data processed via big data analytics component 210 (see below)—that characteristic(s) of a wireless communication network satisfy a defined condition, e.g., defined by a policy rule of policy component 410 (see below). Further, the artificial intelligence system, via policy enabled SDN component 130 (see below), can automatically configure, utilizing NFV, a resource of the wireless communication network based on the policy rule.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, as used herein, the terms "user," "subscriber," "customer," "consumer," "operator," "network maintenance operator," "administrator," and the like refer generally to human entities or automated components supported through artificial intelligence (e.g., a capacity to make inference based on complex mathematical formalisms), which can provide simulated vision, sound recognition and so forth.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Aspects, features, and/or advantages of the disclosed subject matter can be exploited in substantially any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (GPRS); third generation partnership project (3GPP) long term evolution (LTE); third generation partnership project 2 (3GPP2); ultra mobile broadband (UMB); 3GPP universal mobile telecommunication system (UMTS); high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can include second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a network orchestration and policy based SDN environment (see e.g., 100, 200, etc.), for systems, methods, and/or apparatus disclosed herein can include any suitable mobile and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of the communication network can include any suitable data packet-switched or combination data packet/circuit-switched communication network, wired or wireless IP network such as a VoLTE network, a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a wireless system e.g., a wireless communication device, UE 1120 (see below), etc. for systems, methods, and/or apparatus disclosed herein can include a mobile device, a mobile phone, a 4G, etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/Wi-Fi device, such as a dual-mode GSM, TDMA, IS-95 and/or iDEN/VoIP phones, UMTS phones, UMTS VoIP phones, or like devices or combinations thereof.

With the exponential growth in an amount of mobile users, applications, services and devices, e.g., IoT, M2M, etc., data in mobile networks corresponding to service requests are scattered across different domains, e.g., a user domain, a device domain, a network domain, etc., static, e.g., subscriber information associated with a Home Subscriber Server (HSS) device, transient, e.g., QoS settings, etc. Consequently, managing and analyzing such data, e.g., state information associated with the service requests, users, devices, etc. has been challenging.

On the other hand, various embodiments disclosed herein can optimize network performance and improve wireless customer experiences by providing a network orchestration and policy based SDN environment for dynamically allocating, modifying, etc. resources within a wireless communication network utilizing big data analytics. In this regard, and now referring to FIGS. 1, 2, and 3, policy enabled SDN component 130 can facilitate storage, management, and analysis of scattered data, e.g., linking user data, device data, etc. with associated service requests and network conditions in real-time, near real-time, etc. utilizing big data analytics technologies, e.g., Hadoop.

As illustrated by FIG. 1, policy enabled SDN component 130 can be communicatively coupled to service request component 110 and contextual data component 120. Service request component 110 can determine, via a software-based application of a control plane of a communication network based on a service policy rule of a policy framework, defined set of policy rules, etc. of policy component 410 (see below), in real time, near-real time, etc. service data 205 corresponding to a request for a network service, e.g., phone call, message, multimedia based message, video, etc. In one more embodiments, service data 205 can include information representing a source, a user, a subscriber, etc. corresponding to the request, a type of the request, a resource corresponding to the request, a time of the request, information representing a sponsor, or communication provider, of the request, etc.

Contextual data component 120 can determine, via the software-based application of the control plane based on a contextual policy rule of the policy framework, defined set of policy rules, etc. of policy component 410, in real time, near real-time, etc., e.g., in response to detection of the request, etc. contextual information corresponding to, representing, etc. a subscription of the network service. In one or more embodiments, the contextual information can include device data 203, user data 207, and network data 209. Device data 203 can represent a type of a wireless communication device, e.g., UE 1120 (see below), corresponding to the subscription, a capability of the wireless communication device, etc. User data 207 can represent an ID of the subscriber, authentication key(s) corresponding to the network service, a privacy profile of the subscriber, a subscription of the network service, preference(s) for the network service, location information of the wireless communication device, charging and/or billing information corresponding to the network service, information representing whether the request corresponds to a postpaid service, a prepaid service, an MVNO, a roaming network service, etc. Further, network data 209 can represent respective conditions of component(s), device(s), etc. within a forward plane, data plane, etc. of the communication network corresponding to data packet transmissions, a configuration of the component(s), device(s), etc., features of the component(s), device(s), etc., capabilities of the component(s), device(s), etc., QoS information corresponding to the subscription, current usage, available bandwidth, etc. of the communication network, etc.

Figure 2:
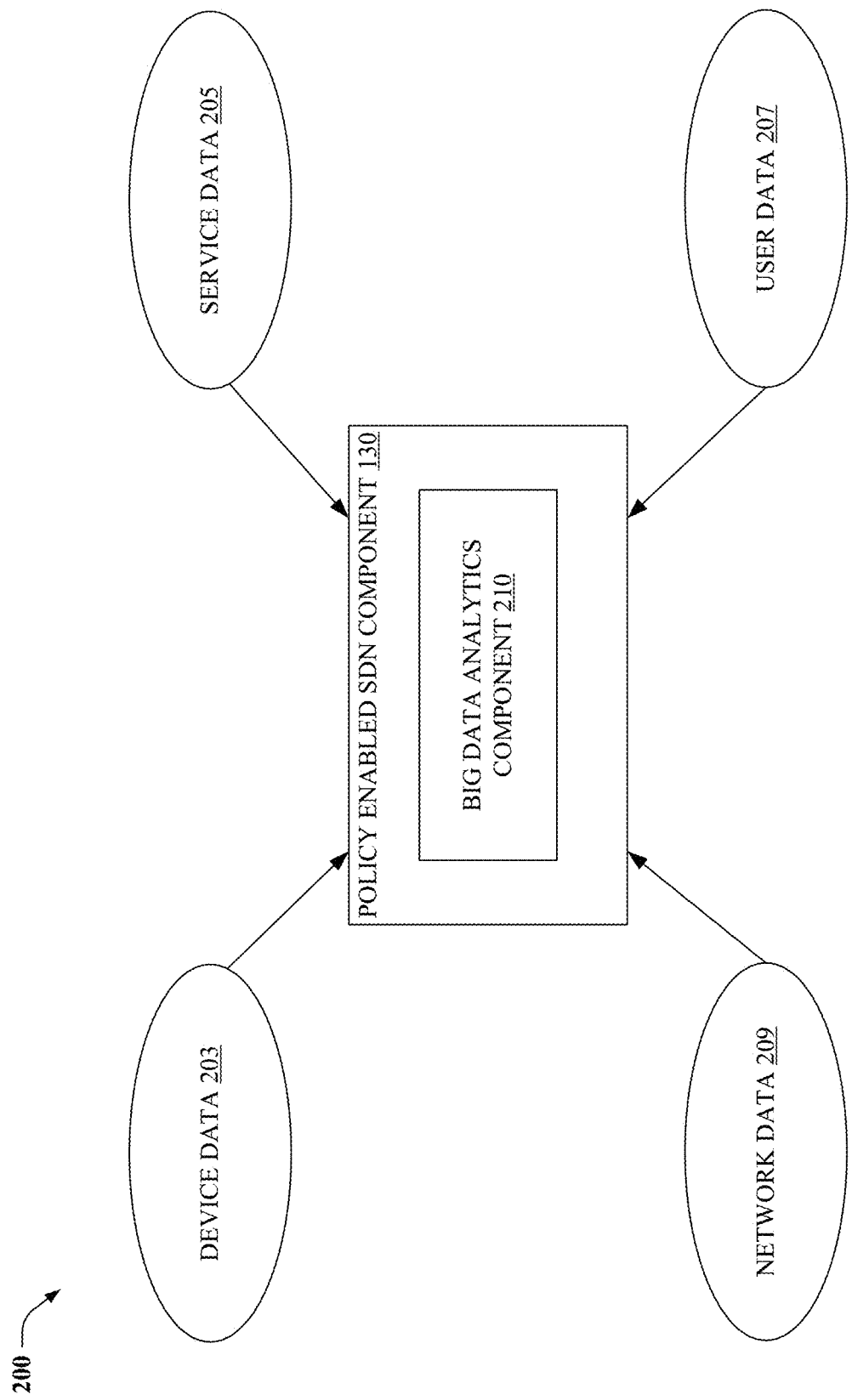
FIG. 2 illustrates a block diagram of another network orchestration and policy based SDN environment corresponding to a wireless communication network, in accordance with various embodiments.

Correspondingly, as illustrated by FIG. 2, policy enabled SDN component 130 can receive, obtain, etc. in real-time, near-real time, etc., via the software-based application of the control plane, device data 203, service data 205, user data 207, and network data 209, e.g., as determined, obtained, etc. by service request component 110 and contextual data component 120, e.g., utilizing network function virtualizations (NFVs) via an open API infrastructure. Further, big data analytics component 210 can heuristically process, e.g., store, manage, analyze, etc. such data according to the policy framework using an analytics engine, e.g., Hadoop, etc.

Figure 3:
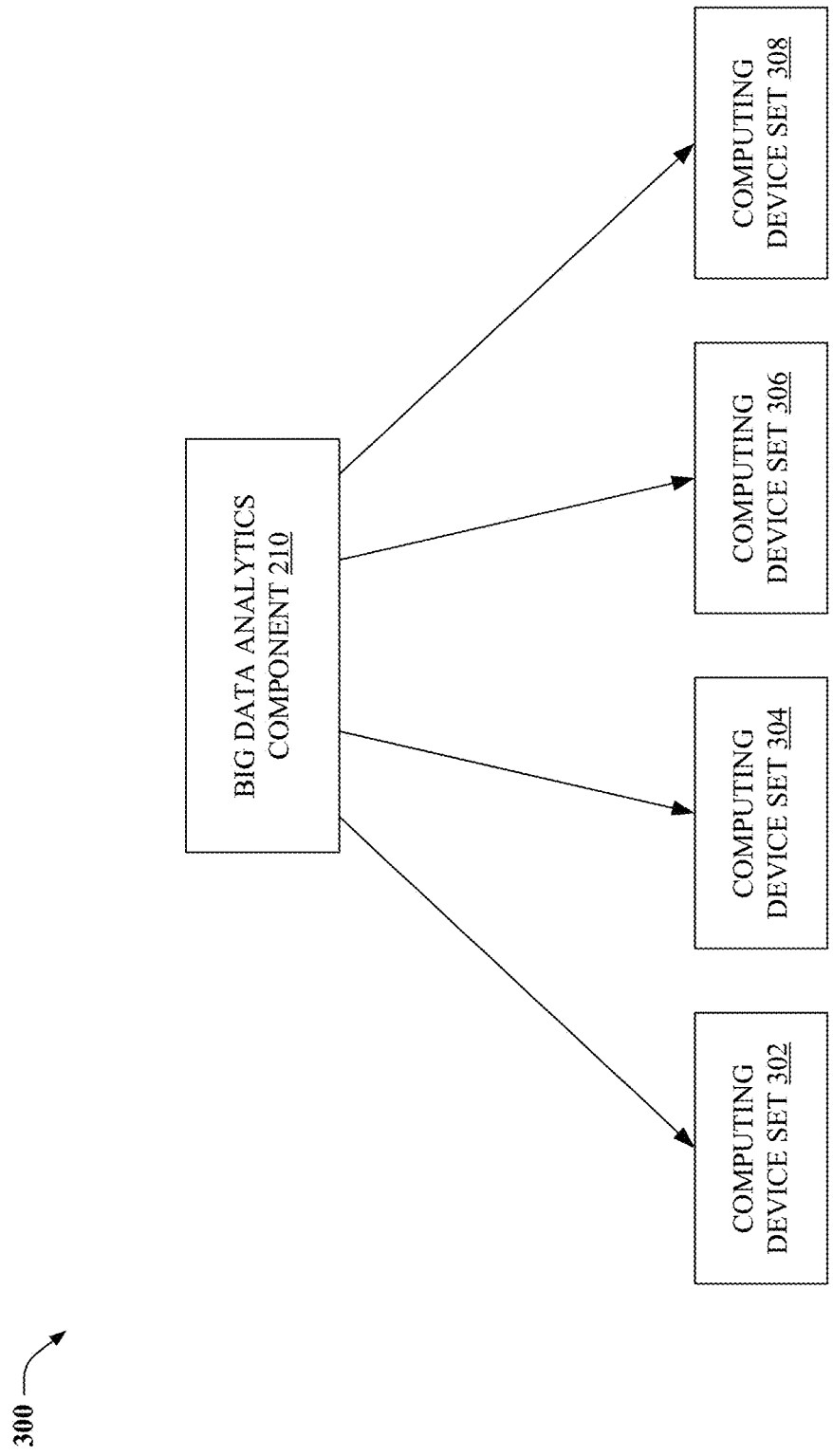
FIG. 3 illustrates a block diagram of sets of distributed computing devices, in accordance with various embodiments.

For example, in embodiment(s) illustrated by FIG. 3, big data analytics component 210 can use a distributed set of computing devices including computing device set 302, computing device set 304, computing device set 306, and computing device set 308 to pre-process, filter, etc. domains of data corresponding to the request based on policy rule(s) of the defined set of policy rules, the policy framework, etc. to obtain processed data. The computing device sets (302, 304, 306, 308) can each utilize a Hadoop distributed file system (HDFS), and represent a respective data cluster corresponding to a domain of the domains of data, e.g., a service domain associated with 302, a user domain associated with 304, a device domain associated with 306, a network domain associated with 308, etc. It should be appreciated by a person of ordinary skill in the art having the benefit of the instant disclosure that more than one computing device can be utilized to pre-process-filter, etc. each domain of data, and the computing device sets (302, 304, 306, 308) can include one or more processing, data processing, etc. components, devices, servers, etc. Further, such components, devices, etc. can be utilized in virtual storage environments, e.g., as virtual machines, etc. stored in a cloud-based storage, computing environment, etc. In turn, in various embodiments, each of the data clusters can be associated with metadata corresponding to analytic operations performed by Hadoop within the cloud-based storage, computing environment, etc.

Further, big data analytics component 210 can use the processed data to link, correlate, etc. the domains of data to/with a determined condition, event, etc. corresponding to the request for the network service. For example, policy enabled SDN component 130 can utilize the processed data to determine a state of the communication network, e.g., a network congestion condition associated with a network device, traffic flow information associated with the network device, security information associated with the network device, etc. In turn, in response to determining, based on a policy rule defining a constraint corresponding to the state of the communication network, that that constraint has been met, policy enabled SDN component 130 can reconfigure, modify, etc. a resource of the communication network according to the policy rule.

For example, in another embodiment, policy enabled SDN component 130 can configure the resource from the control plane utilizing NFV within forward plane 150, e.g., a data plane, a user plane etc. of the network orchestration and policy based SDN environment, e.g., in response to determining that a communication bandwidth of the network device exceeds a defined utilization rate for the network device, policy enabled SDN component 130 can configure, reconfigure, a resource utilizing NFV based on the constraint, e.g., re-routing communication traffic from the network device to another network device, e.g., GW.

Figure 4:
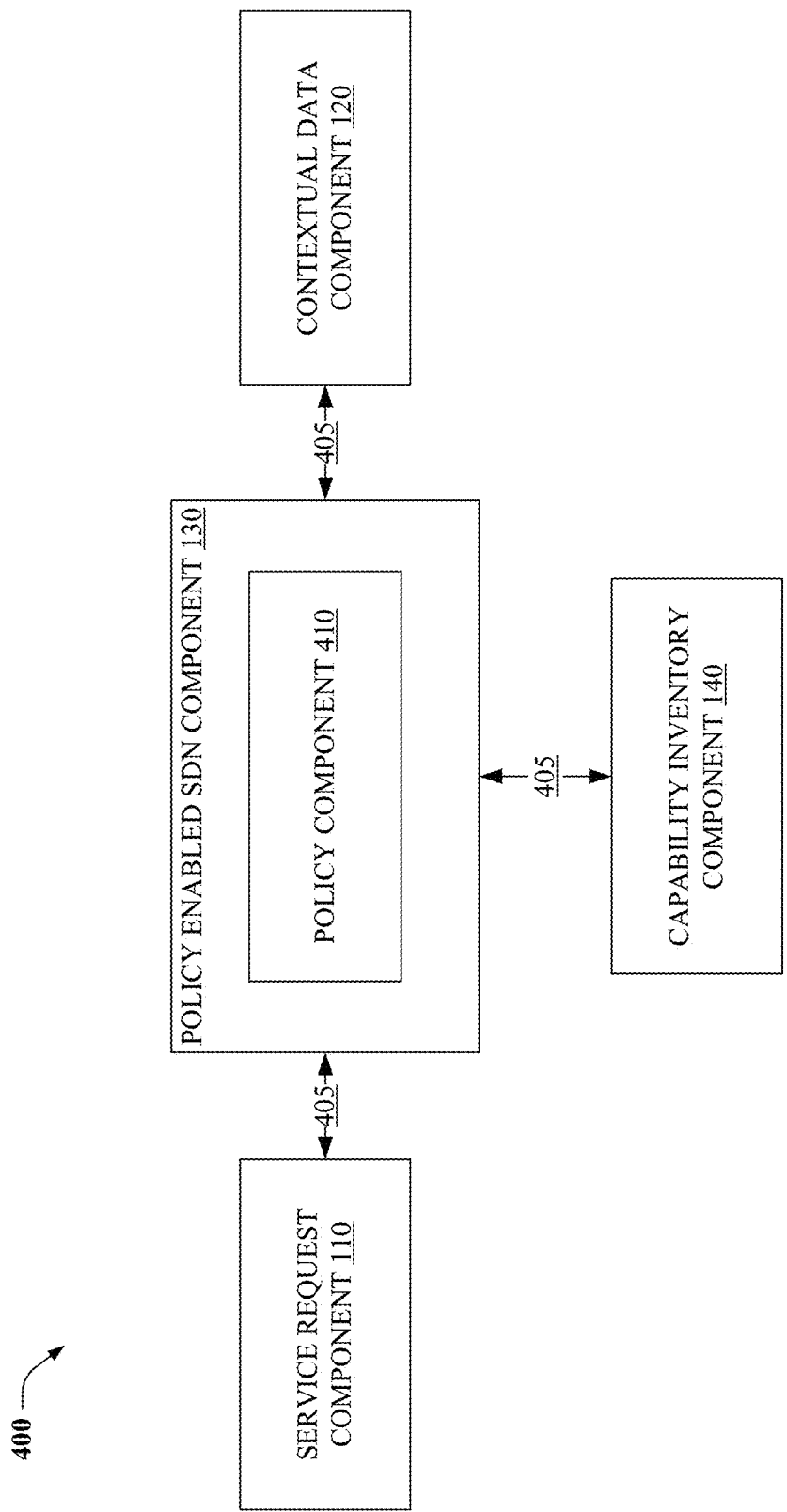
FIG. 4 illustrates a block diagram of a policy enabled SDN component, in accordance with various embodiments.

Referring now to FIG. 4, a block diagram (400) of a policy enabled SDN component including policy component 410 is illustrated, in accordance with various embodiments. Policy component 410 can define the set of policy rules, the policy framework, etc. and can include policy rules, service policy rules, etc. defining actions to be performed utilizing NFV in response to respective conditions, e.g., defined by the policy rules, being determined to have been met. In this regard, in an embodiment, policy enabled SDN component 130 can anticipate, derive, compile, etc. an optimized configuration of the resource, e.g., using the processed data obtained via big data analytics component 210, and modify, via a feedback loop, a policy rule of policy rules utilizing policy component 410.

As illustrated by FIG. 4, policy enabled SDN component can interface with various components, devices, applications, services, etc. within a network orchestration and policy based SDN environment utilizing an open API infrastructure, e.g., API 405. For example, policy enabled SDN component 130 can be communicatively coupled, via API 405, to capability inventory component 140, e.g., a capability onboarding component, which can publish, advertise, etc. configuration information of the resource, a policy rule, etc. to other components within the network orchestration and policy based SDN environment, e.g., using API 405.

Figure 5:
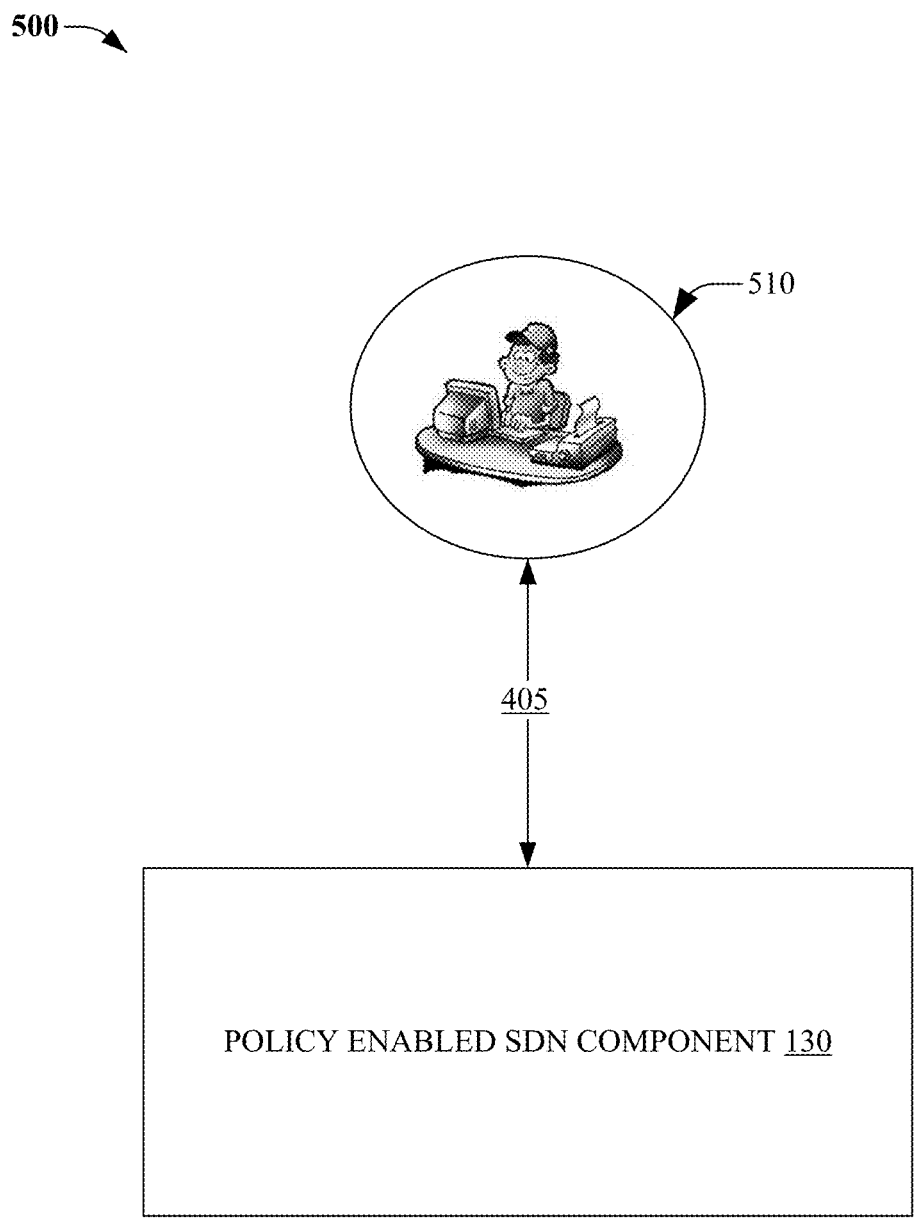
FIG. 5 illustrates a block diagram of a user interface (UI) component for policy control corresponding to a policy enabled SDN component of a wireless communication network, in accordance with various embodiments.

In an embodiment illustrated by FIG. 5, policy component 130 can display and/or receive information via API 405 using user interface (UI) component 510. In this regard, UI component 510 can include a web-based, graphical user interface (GUI) (not shown) that can act as a "control interface" communicatively coupled, via policy enabled SDN component 130, to component(s), device(s), etc. of network orchestration and policy based SDN environment 100, 200, 300, 400, 500, 600, etc. For example, UI component 510 can be configured to display, via a monitor, display device, etc. (not shown) policy framework information, status information, network information, etc. reported by policy enabled SDN component 130. In another embodiment, policy component 410 can receive, via API 405, policy input, e.g., representing a policy rule, etc. from UI component 510. In this regard, policy component 410 can modify the policy framework based on the policy input.

Figure 6:
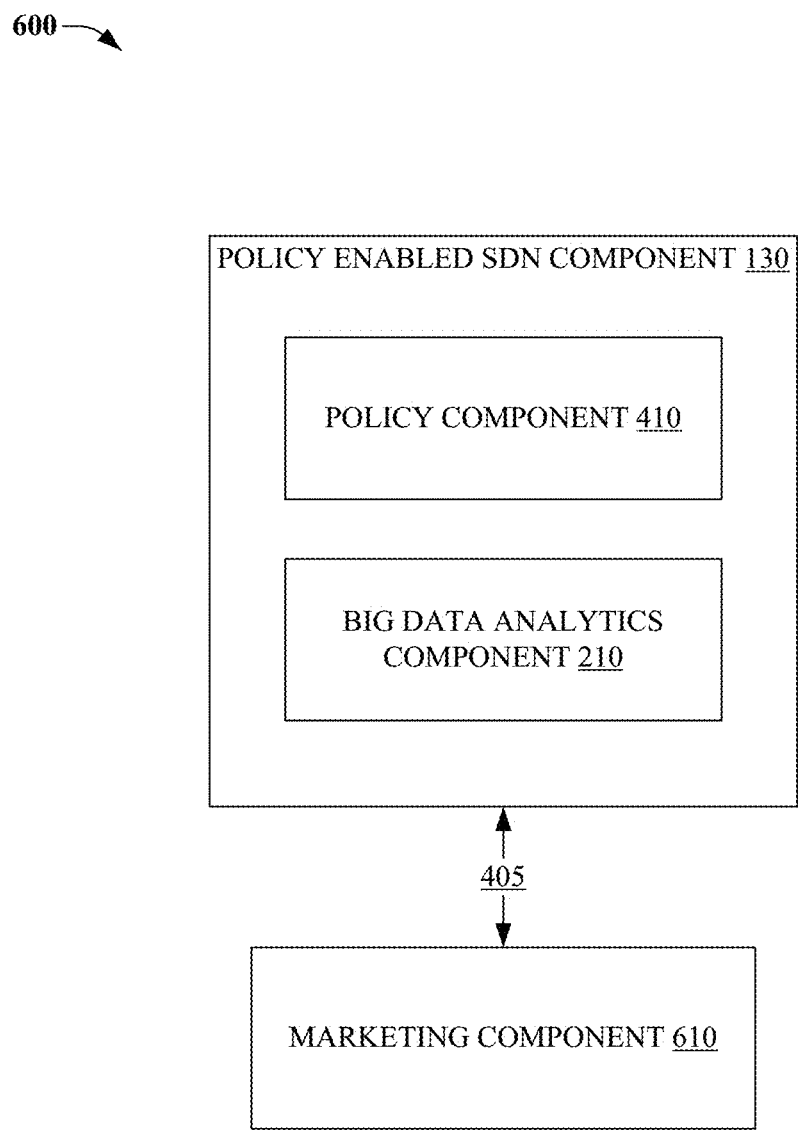
FIG. 6 illustrates a block diagram of a marketing component communicatively coupled to a policy enabled SDN component, in accordance with various embodiments.
Figure 7:
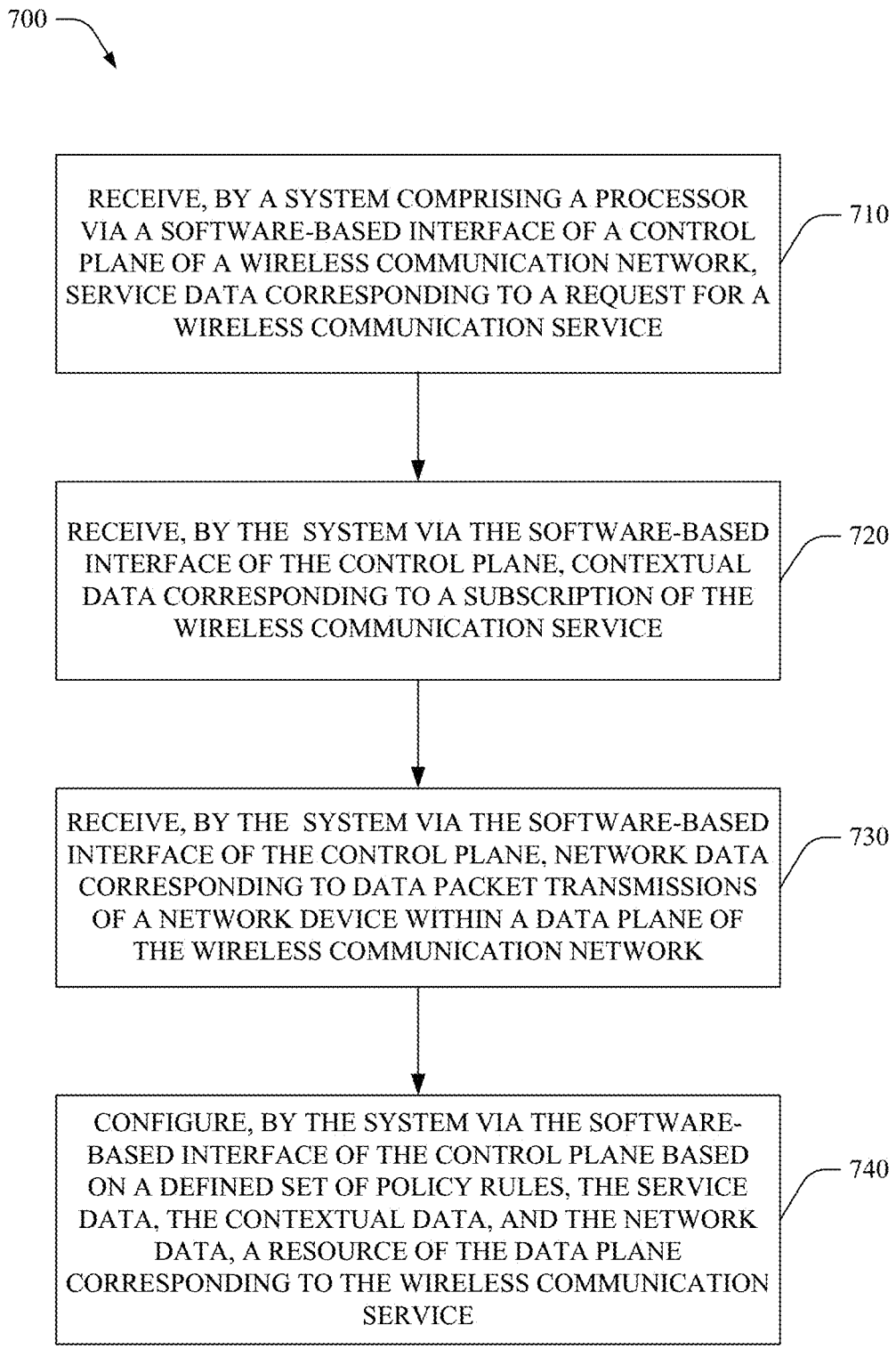
FIGS. 7-10 illustrate flowcharts of methods associated with a network orchestration and policy based SDN environment, in accordance with various embodiments.

Now referring to FIG. 6, marketing component 610 is illustrated, in accordance with various embodiments. Marketing component 610 can derive, via the software-based application of the control plane, policy rules, e.g., via UI component 510, for optimizing network performance, improving wireless customer experiences, etc. In one embodiment, marketing component 610 can derive a policy rule for providing a new communication service to a subscriber, customer, etc. in response to policy enabled SDN component 130 detecting, via big data analytics component 210, a network condition that would affect a requested communication service. For example, marketing component 610 can define a policy rule specifying that if a radio access network (RAN) component, device, etc. has been determined, e.g., by policy enabled SDN component 130, to be congested, Wi-Fi communication access, service, etc. is to be provided, via policy enabled SDN component 130, without user, subscriber, etc. intervention.

FIGS. 7-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 7-10, processes 700 to 1000 performed by component(s) described herein, e.g., policy enabled SDN component 130, are illustrated, in accordance with various embodiments. At 710, service data corresponding to a request for a wireless communication service can be received, by a system, e.g., an SDN based system, etc. comprising a processor via a software-based interface of a control plane of a communication network. The service data can correspond to requests from applications and services for resources of a wireless communication network, such as a request for a phone call, a message, a video, etc. In other embodiment(s), the service data can include information representing a resource corresponding to the request, a type of service corresponding to the request, a time of the request, information representing a sponsor, or communication provider, of the request, etc.

At 720, contextual data corresponding to a subscription of the wireless communication service can be received by the SDN based system via the software-based interface of the control plane. The contextual data can include device information and user information. The device information can represent a device, e.g., a wireless communication device, etc. corresponding to the request, a type of the wireless communication device, capabilities of the wireless communication device, etc. The user information can represent an identification (ID) of a subscriber, a user, etc. of the wireless communication service, authentication key(s) corresponding to the wireless communication service, a privacy profile of the subscriber, details of a subscription of the wireless communication service, preference(s) for the wireless communication service, location information of the wireless communication device, charging and/or billing information corresponding to the wireless communication service, type information representing whether the request corresponds to a postpaid service, a prepaid service, a mobile virtual network operator (MVNO), a roaming wireless communication subscriber, etc.

At 730, network data corresponding to data packet transmissions of a network device within a data plane of the wireless communication network can be received by the SDN based system via the software-based interface of the control plane. The network data can include information representing conditions of the wireless communication network, a configuration of component(s), device(s), etc. of the wireless communication network, features of the wireless communication network, capabilities of the wireless communication network, quality of service (QoS) information, reporting of current usage, available bandwidth, etc. of the wireless communication network, etc.

At 740, a resource of the data plane corresponding to the wireless communication service can be configured by the SDN based system via the software-based interface of the control plane, e.g., utilizing NFV, for example, within a forward plane, data plane, user plane, etc. of the wireless communication network, based on a defined set of policy rules, a policy framework, etc., the service data, the contextual data, and the network data.

Figure 8:
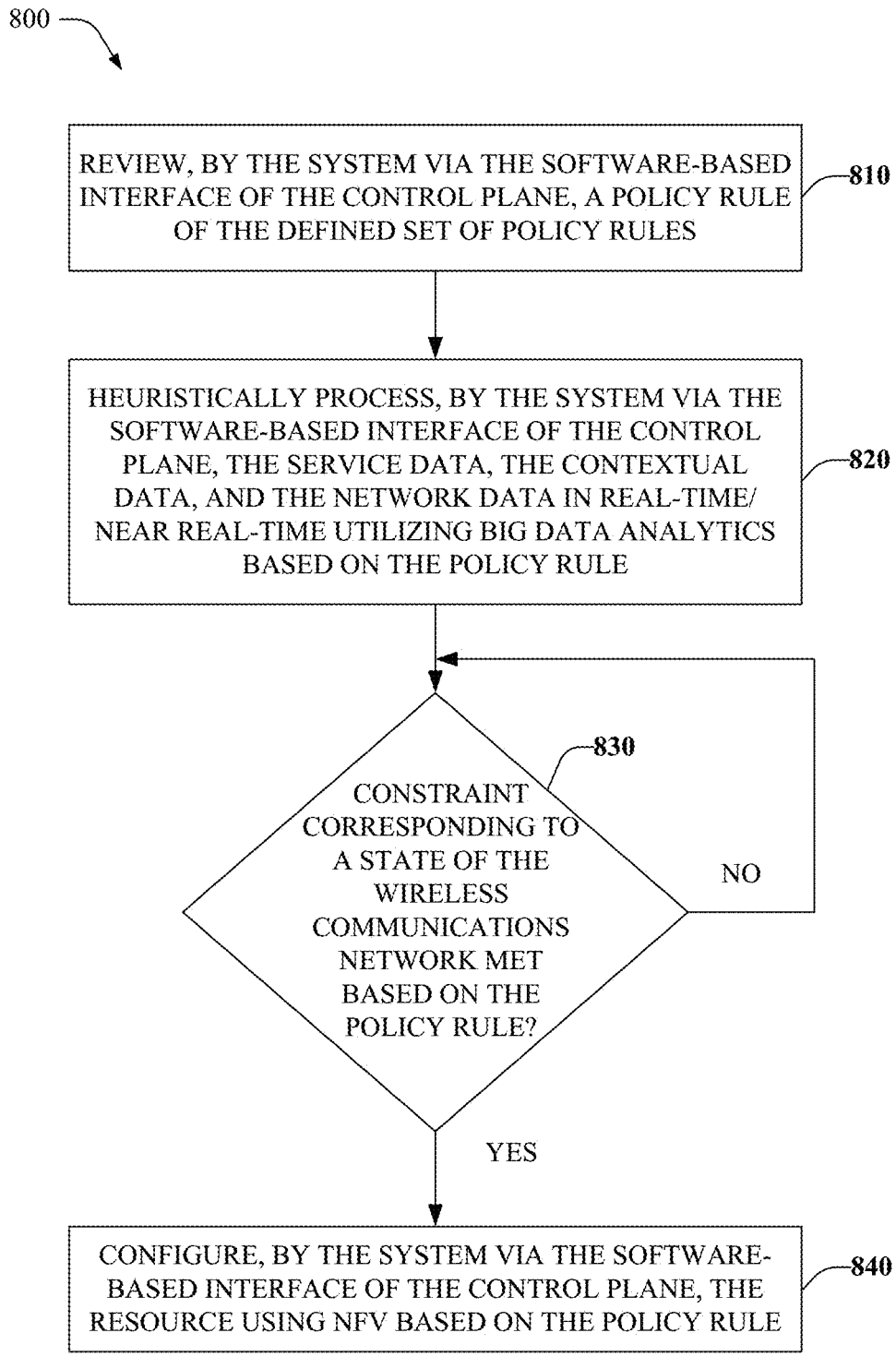

Referring to embodiment(s) illustrated by FIG. 8, a policy rule of the defined set of policy rules can be reviewed by the SDN based system via the software-based interface of the control plane at 810. At 820, the service data, the contextual data, and the network data can be heuristically processed in real-time or near-real time by the SDN based system, via the software-based interface of the control plane, utilizing big data analytics based on the policy rule. In an embodiment, the SDN based system can heuristically process such data using an analytics engine, e.g., Hadoop via set(s) of distributed computing devices utilizing a Hadoop distributed file system (HDFS), to obtain structured or unstructured data.

At 830, it can be determined whether a constraint that has been defined by the policy rule and corresponds to a state of the wireless communication network has been met, reached, etc. For example, it can be determined whether a network device, e.g., a source GW, does not have available bandwidth, cannot provide additional communication traffic load, etc. to support the request for the wireless communication service. If it is determined that the constraint has been met, reached, etc., flow continues to 840, at which the resource corresponding to the wireless communication service can be configured by the SDN based system via the software-based interface of the control plane using NFV based on the policy rule, e.g., the SDN based system can utilize an orchestration mechanism to migrate, redirect, etc. a communication session corresponding to the wireless communication service from the source GW to a target GW in response to a determination that the source GW cannot support the request for the wireless communication service; otherwise flow returns to 830.

Figure 9:
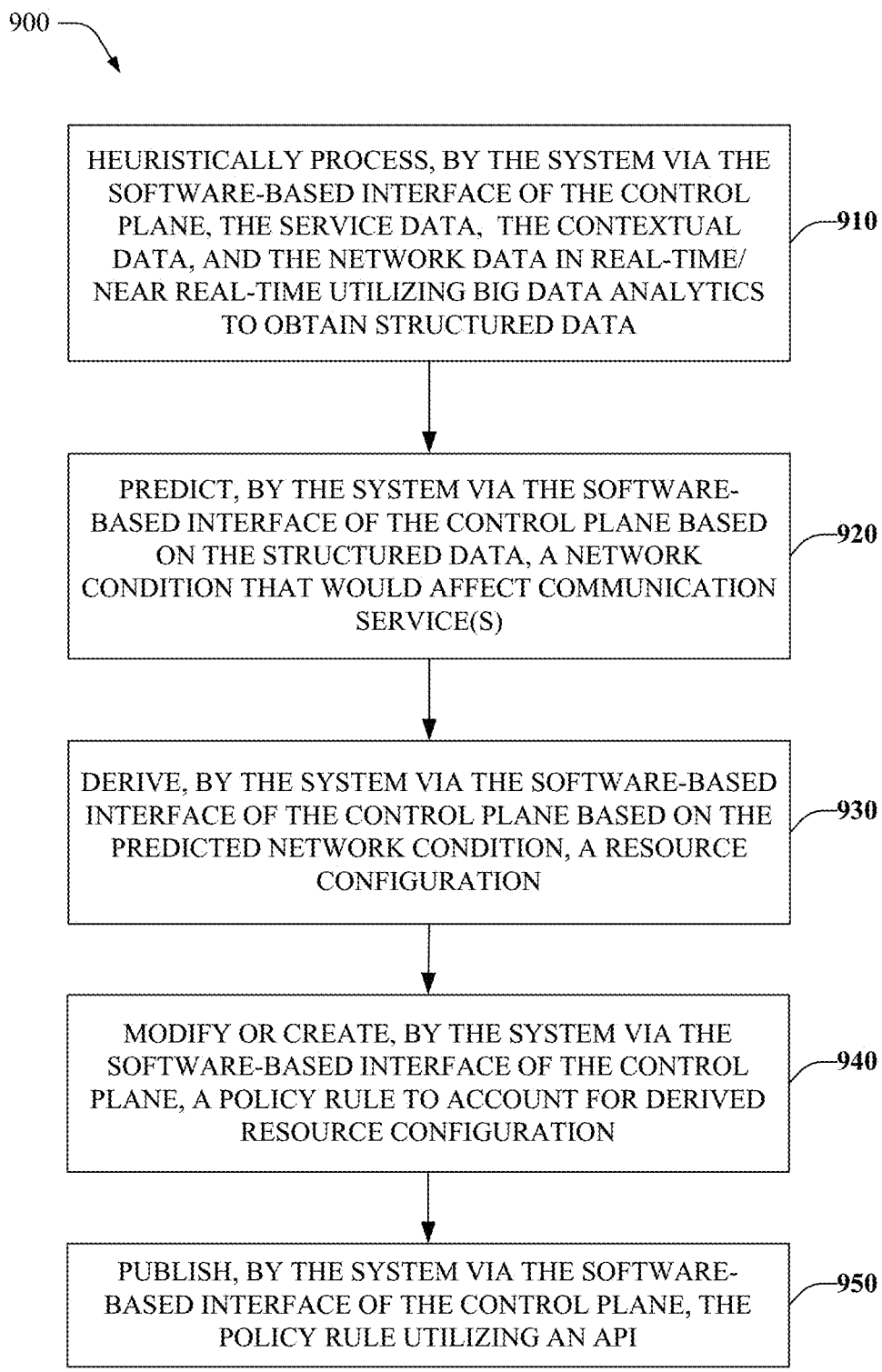

Referring now to embodiment(s) illustrated by FIG. 9, at 910, the service data, the contextual data, and the network data can be heuristically processed in real-time or near-real time by the SDN based system via the software-based interface of the control plane utilizing big data analytics, e.g., Hadoop via set(s) of distributed computing devices, to obtain structured or unstructured data. At 920, the SDN based system can predict, anticipate, etc., via the software-based interface of the control plane based on the structured or unstructured data, a network condition that would affect communication service(s). At 930, the SDN based system can derive, compile, etc., via the software-based interface of the control plane, a revised, optimal, etc. resource configuration based on the predicted network condition. At 940, the SDN based system can modify or create, via the software-based interface of the control plane, a policy rule to account for, utilize, etc, the derived resource configuration. At 950, the SDN based system can publish, advertise, etc., via the software-based interface of the control plane, the policy rule utilizing an API.

Figure 10:
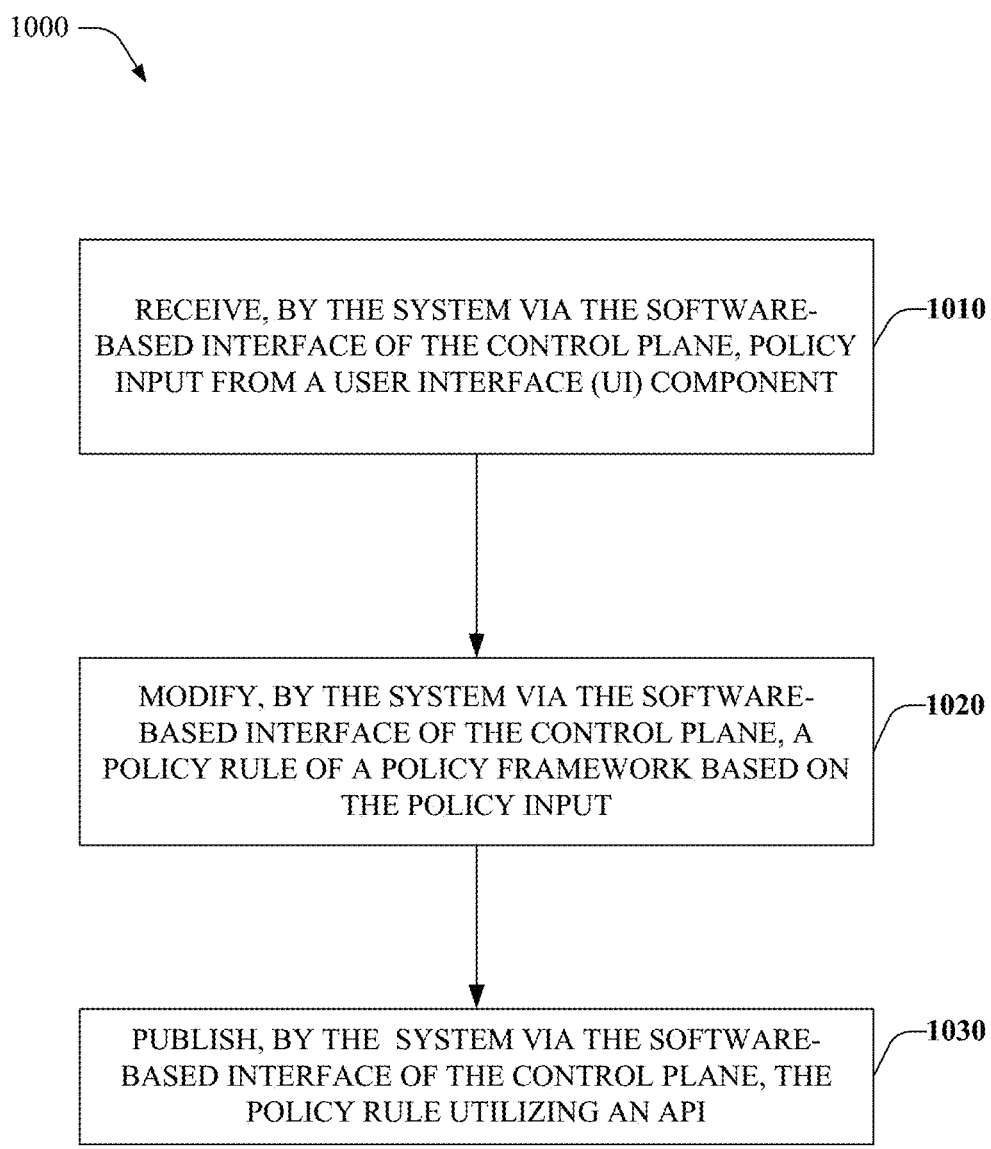

Now referring to embodiment(s) illustrated by FIG. 10, at 1010, policy input can be received, by the SDN based system via the software-based interface of the control plane, from UI component 510, e.g., utilizing an API. At 1020, a policy rule of a policy framework can be modified by the SDN based system via the software-based interface of the control plane based on the policy input. At 1030, the SDN based system can publish, via the software-based interface of the control plane, the policy rule, e.g., to application(s), service(s), component(s), etc. utilizing another API.

Figure 11:
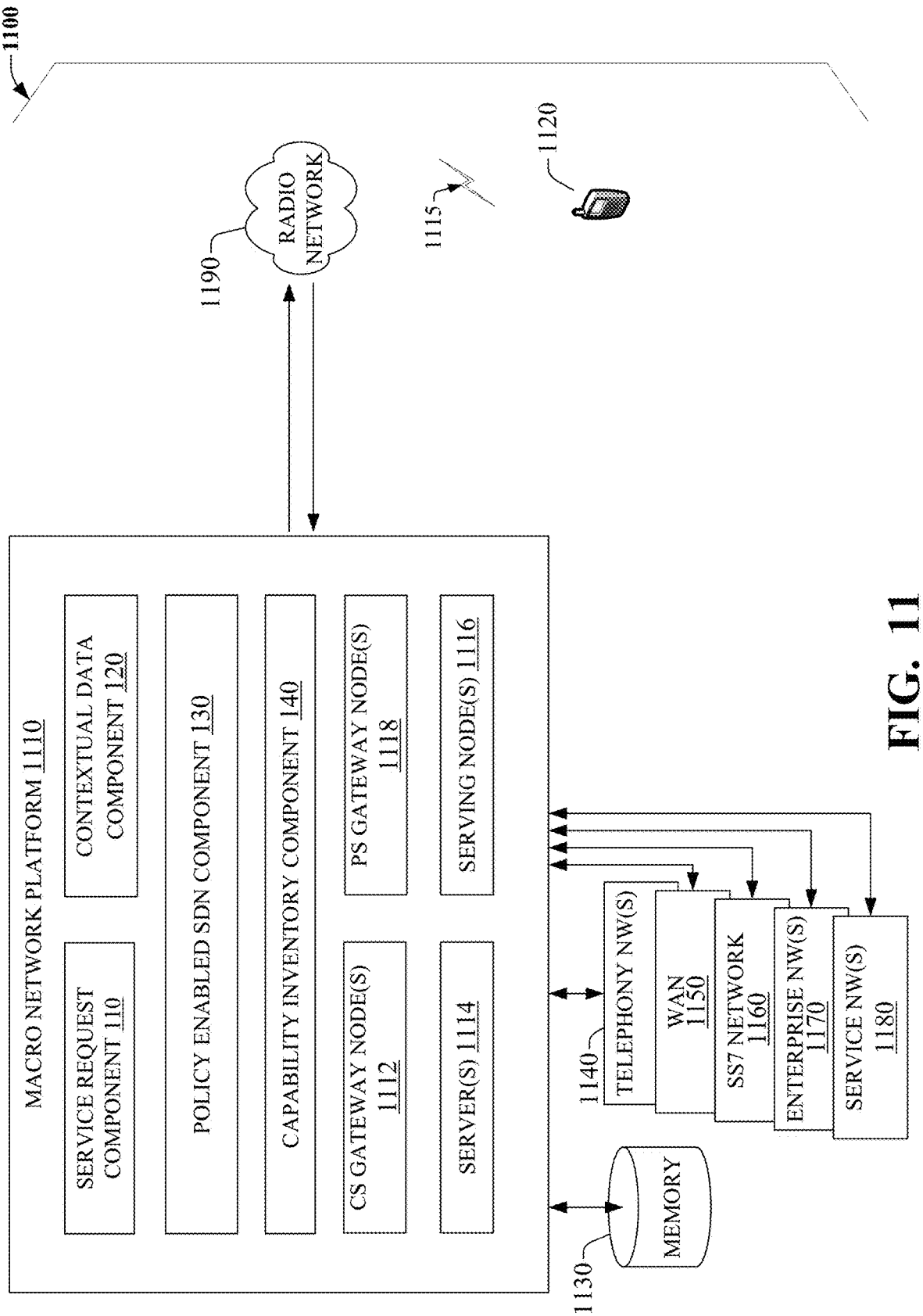
FIG. 11 illustrates a block diagram of a wireless network environment, in accordance various embodiments.

With respect to FIG. 11, a wireless communication environment 1100 including macro network platform 1110 is illustrated, in accordance with various embodiments. Macro network platform 1110 serves or facilitates communication with UE 1120 via radio network 1190. It should be appreciated that in cellular wireless technologies, e.g., 3GPP UMTS, HSPA, 3GPP LTE, 3GPP2 UMB, LTE-A, etc. that can be associated with radio network 1190, macro network platform 1110 can be embodied in a core network. It is noted that radio network 1190 can include base station(s), base transceiver station(s), access point(s), etc. and associated electronic circuitry and deployment site(s), in addition to a wireless radio link operated in accordance with the base station(s), etc. Accordingly, radio network 1190 can comprise various coverage cells, or wireless coverage areas.

Generally, macro network platform 1110 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication. In various embodiments, macro network platform 1110 includes CS GW node(s) 1112 that can interface CS traffic received from legacy networks like telephony network(s) 1140, e.g., public switched telephone network (PSTN), public land mobile network (PLMN), Signalling System No. 7 (SS7) network 1160, etc. CS GW node(s) 1112 can authorize and authenticate traffic, e.g., voice, arising from such networks. Additionally, CS GW node(s) 1112 can access mobility or roaming data generated through SS7 network 1160; for instance, mobility data stored in a visitor location register (VLR), which can reside in memory 1130. Moreover, CS GW node(s) 1112 interfaces CS-based traffic and signaling with PS GW node(s) 1118. As an example, in a 3GPP UMTS network, PS GW node(s) 1118 can be embodied in GW GPRS support node(s) (GGSN).

As illustrated by FIG. 11, PS GW node(s) 1118 can receive and process CS-switched traffic and signaling via CS GW node(s) 1112. Further PS GW node(s) 1118 can authorize and authenticate PS-based data sessions with served, e.g., via radio network 1190, wireless devices, e.g., UE 1120. Such data sessions can include traffic exchange with networks external to the macro network platform 1110, like wide area network(s) (WANs) 1150; enterprise networks (NWs) 1170, e.g., E911, service NW(s) 1180, e.g., an IP multimedia subsystem (IMS), etc. It should be appreciated that local area network(s) (LANs), which may be a part of enterprise NW(s) 1170, can also be interfaced with macro network platform 1110 through PS GW node(s) 1118. PS GW node(s) 1118 can generate packet data contexts when a data session is established, e.g., associated with an EPS bearer context activation. To that end, in an aspect, PS GW node(s) 1118 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1114. It is to be noted that in 3GPP UMTS network(s), PS GW node(s) 1118 (e.g., GGSN) and tunnel interface (e.g., TTG) comprise a packet data GW (PDG).

Macro network platform 1110 also includes serving node(s) 1116 that can convey the various packetized flows of information, or data streams, received through PS GW node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1110. Data streams can be conveyed to PS GW node(s) 1118 for authorization/authentication and initiation of a data session, and to serving node(s) 1116 for communication thereafter. Server(s) 1114 can also effect security, e.g., implement one or more firewalls, of macro network platform 1110 to ensure network's operation and data integrity in addition to authorization and authentication procedures that CS GW node(s) 1112 and PS GW node(s) 1118 can enact. Moreover, server(s) 1114 can provision services from external network(s), e.g., WAN 1150, or global positioning system (GPS) network(s), which can be a part of enterprise NW(s) 1180. It is to be noted that server(s) 1114 can include one or more processors configured to confer at least in part the functionality of macro network platform 1110. To that end, the one or more processors can execute code instructions stored in memory 1130, for example.

In wireless communication environment 1100, memory 1130 can store information related to operation of macro network platform 1110, e.g., related to operation of policy enabled SDN component 130. The information can include business data associated with subscribers; market plans and strategies, e.g., promotional campaigns, business partnerships, mobile devices served through macro network platform, etc.; service and privacy policies; end-user service logs for law enforcement; term(s) and/or condition(s) associated with wireless service(s) provided via radio network 1190; and so forth. Memory 1130 can also store information from at least one of telephony network(s) 1140, WAN 1150, SS7 network 1160, enterprise NW(s) 1170, or service NW(s) 1180.

In one or more embodiments, components of core network environment 1100 can provide communication services to UE 1120 via radio network 1190 utilizing over-the-air wireless link 1115. In this regard, radio network 1190 can include one or more: macro, Femto, or pico access points (APs) (not shown); base stations (BS) (not shown); landline networks (e.g., optical landline networks, electrical landline networks) (not shown) communicatively coupled between UE 1120 and macro network platform 1110. Further, over-the-air wireless link 1115 can comprise a downlink (DL) and an uplink (UL) (both not shown) that can utilize a predetermined band of radio frequency (RF) spectrum associated with any number of various types of wireless technologies including, but not limited to, cellular, LTE, LTE-A, GSM, 3GPP UMTS, Wi-Fi, WiMax, wireless local area networks (WLAN), Femto, etc.

Core network environment 1100 can include one or more of the Internet (or another communication network (e.g., IP-based network)), or a digital subscriber line (DSL)-type or broadband network facilitated by Ethernet or other technology. In various embodiments, core network environment 1100 can include hardware and/or software for allocating resources to UE 1120, converting or enforcing protocols, establishing and/or providing levels of quality of service (QoS), providing applications or services, translating signals, and/or performing other desired functions to facilitate system interoperability and communication to/from UE 1120.

In other embodiment(s), core network environment 1100 can include data store component(s), a memory configured to store information, computer-readable storage media storing computer-executable instructions, e.g., memory 1030, etc. enabling various operations performed via policy enabled SDN component 130 as described herein. In this regard, core network environment 1100 can include data store component(s) associated with policy component 410 for storing policy data, condition(s), action(s), etc. representing policy rules for triggering, initiating, etc. action by systems and components described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory 1220 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
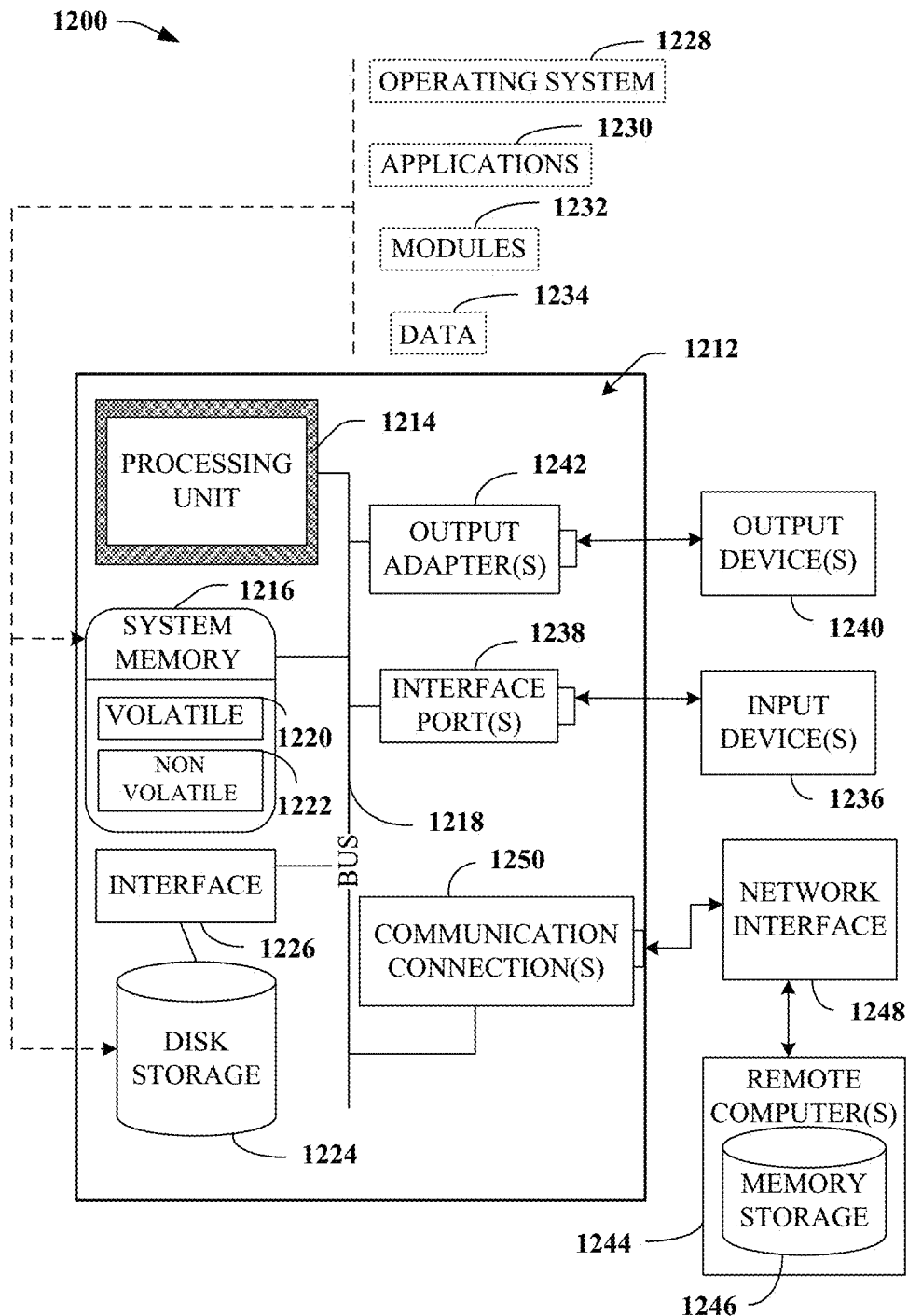
FIG. 12 is a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands, e.g., via UI component 510, or information into computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 include, for example, a serial port, a parallel port, a game port, a universal serial bus (USB), a wireless based port, e.g., Wi-Fi, Bluetooth, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 include, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit switching networks like integrated services digital networks (ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a system comprising a processor from a network device of network devices of a communication network, service data corresponding to a request for a wireless communication service;
   receiving, by the system, contextual data comprising device information representative of capabilities of a wireless device associated with a subscriber identity that is subscribed to the wireless communication service;
   receiving, by the system, network data corresponding to data packet transmissions of ones of the network devices associated with a data plane of the communication network; and
   in response to correlating, using metadata corresponding to analytic operations performed via respective groups of devices of distributed groups of devices of a distributed file system, a first data cluster of a first data domain corresponding to the service data, a second data cluster of a second data domain corresponding to the contextual data, and a third data cluster of a third data domain corresponding to the network data with a state of the network devices of the communication network corresponding to the request for the wireless communication service, and further in response to determining that the state of the network devices of the communication network satisfies a constraint that has been defined by a policy rule representing that a source gateway device does not have an available bandwidth to support the request for the wireless communication service,
      redirecting, by the system, a communication session corresponding to the wireless communication service from the source gateway device to a target gateway device,
      based on the service data, the contextual data, and the network data, modifying, by the system, via a software-based interface of a control plane of the communication network, the policy rule to obtain a modified policy rule representing a use of a modified configuration represented by the redirecting of the communication session, and
      storing, by the system, the modified policy rule in a storage device of the system.

2. The method of claim 1, wherein the redirecting comprises configuring the target gateway device utilizing network function virtualization.

3. The method of claim 1, further comprising:
   based on the network data, identifying, by the system via the software-based interface of the control plane of the communication network, a resource constraint on a resource of the data plane corresponding to the wireless communication service.

4. The method of claim 3, further comprising configuring the resource based on the resource constraint.

5. The method of claim 1, further comprising:
   in response to the redirecting, publishing, by the system via the software-based interface of the control plane of the communication network, configuration information corresponding to the communication session.

6. The method of claim 1, further comprising:
   receiving, by the system via the software-based interface of the control plane of the communication network, a policy input via an application programming interface; and
   modifying, by the system via the software-based interface of the control plane and based on the policy input, the policy rule.

7. A system, comprising:
   a processor; and
   a memory that stores executable instructions that, when executed by the processor, facilitate performance of operations, comprising:
      determining, via a software-based application of a control plane of a communication network based on a service policy rule of defined policy rules, service information representing a request for a service of the communication network;
      determining, via the software-based application of the control plane based on a contextual policy rule of the defined policy rules, contextual information representing a subscription of the service;
      determining, via the software-based application of the control plane based on a network status policy rule of the defined policy rules, network information corresponding to a condition of a network device within a forward plane of the communication network corresponding to data packet transmissions; and
      in response to linking, via metadata corresponding to operations performed by distributed devices of a distributed file system, a first data cluster representative of the service information, a second data cluster representative of the contextual information, and a third data cluster representative of the network information to the condition of the network device, and in response to the condition of the network device being determined to satisfy one of the defined policy rules representing that a bandwidth of a first gateway device of the forward plane is incompatible with the request for the service,
         redirecting, via the software-based application of the control plane, the service from the first gateway device to a second gateway device,
         in response to the redirecting, modifying, via the software-based application of the control plane based on the service information, the contextual information, and the network information, the one of the defined policy rules to obtain a revised policy, and
         storing the revised policy in a storage device of the system.

8. The system of claim 7, wherein the redirecting comprises configuring the second gateway device utilizing network function virtualization.

9. The system of claim 7, wherein the determining the network information comprises identifying a constraint on a resource of the forward plane based on the condition of the network device.

10. The system of claim 7, wherein the operations further comprise:
    in response to the redirecting, publishing configuration information for the first gateway device.

11. A non-transitory machine-readable storage medium, comprising executable instructions that, when executed by a processor, facilitate performance of operations, comprising:
  determining, within a software-based interface of a control plane of a communication network based on a defined policy framework, request data representing a request for a network service;
  determining, within the software-based interface based on the defined policy framework, contextual data corresponding to a subscription of the network service;
  determining, within the software-based interface based on the defined policy framework, network data representing a condition of a device within a data plane of the communication network corresponding to data packet transmissions; and
  in response to correlating, using metadata corresponding to respective operations performed by a group of devices of a distributed file system, the request data with a network condition of the communication network, the contextual data with the network condition and the network data with the network condition, and in response to determining that the network condition satisfies a defined criterion represented by the defined policy framework with respect to an insufficient bandwidth of a source gateway device,
    transferring, via the software-based interface, a communication service corresponding to the network service from the source gateway device to a target gateway device,
    changing, via the software-based interface based on the request data, the contextual data, and the network data, the defined criterion to obtain a modified criterion representing a use of a modified resource configuration represented by the transferring, and
    storing the modified criterion in storage device.

12. The non-transitory machine-readable storage medium of claim 11, wherein the transferring comprises configuring a resource within the data plane using network function virtualization.

13. The non-transitory machine-readable storage medium of claim 11, wherein the determining the network data comprises determining a constraint on a resource within the data plane based on the condition of the device.

14. The non-transitory machine-readable storage medium of claim 13, wherein the operations further comprise:
  modifying the network service based on the constraint.

15. The method of claim 1, wherein the state of the network devices represents a communication bandwidth of the source gateway device.

16. The method of claim 15, wherein the determining that the state of the communication network satisfies the constraint comprises determining that the communication bandwidth exceeds a defined utilization rate for the network devices.

17. The method of claim 1, wherein the network device comprises the source gateway device.

18. The system of claim 7, wherein the linking comprises linking the first data cluster, the second data cluster, and the third data cluster to the condition of the network device utilizing respective data stores of the distributed devices.

19. The system of claim 7, wherein the operations further comprise:
  in response to receiving, via the software-based application, a policy input via an application programming interface, modifying, via the software-based application based on the policy input, the one of the defined policy rules.

20. The system of claim 9, wherein the operations further comprise:
  configuring the resource based on the constraint.

* * * * *